UNITED STATES PATENT OFFICE.

GEORGE B. OAKES, OF DIGBY, NOVA SCOTIA, CANADA.

MANUFACTURE OF FISH-GUANO.

SPECIFICATION forming part of Letters Patent No. 251,628, dated December 27, 1881.

Application filed April 8, 1881. (No specimens.)

*To all whom it may concern:*

Be it known that I, GEORGE B. OAKES, of Digby, in the province of Nova Scotia and Dominion of Canada, have invented certain new and useful Improvements in the Manufacture of Fish-Guano; and I do hereby declare that the following is a full, clear, and exact description of the invention, which will enable others skilled in the art to which it appertains to make and use the same.

My invention, which has relation to the manufacture of artificial fertilizers from fish or fish-refuse, (known in the trade and among consumers as fish-guano,) consists in a compound of fish-refuse, sulphuric acid, charcoal, gypsum, and salt, and is prepared substantially as I shall now proceed to describe.

The fish, fish-refuse, or gurry, which forms the basis of my improved fertilizer, is cooked by boiling it by steam, or by any other suitable application of heat, until the flesh and bones are reduced to a homogeneous pulpy mass. Either before, during, or after the process of cooking the mass I add to it five per cent., by weight, (more or less,) of sulphuric acid, then break the cooked pulp up by the addition of a suitable quantity of pulverized charcoal or sawdust, or both; or I substitute for these materials any other suitable absorbent, and I then add a suitable quantity (usually from thirty-three to fifty per cent., more or less) of finely-ground gypsum or mineral phosphates. Lastly, I add a suitable quantity of salt to prevent fermentation or decomposition of the fertilizer, this being advantageous when it is to be transported to warm countries or has to undergo long voyages, or if it is to be stored for any considerable length of time. After the mass thus prepared has been thoroughly broken up by the absorbent I pass it through a suitable grinding or pulverizing mill, in which it is reduced to a pulverulent state. The lumps should be thoroughly dried, by natural or artificial heat, before passing them through the grinder, which reduces the entire mass to a fine homogeneous powder, when it is ready for use and may be packed in barrels or boxes of suitable size.

I am well aware that it is not new to manufacture fish-guano by boiling the fish-refuse with the addition of sulphuric acid and then breaking up the boiled mass by the addition of suitable absorbents; nor do I claim, broadly, fish-guano so made; but

What I claim, and desire to secure by Letters Patent of the United States, is the specific compound herein described, to wit—

As an article of manufacture, a pulverized fertilizer composed of boiled fish-refuse, sulphuric acid, pulverized charcoal, finely-ground gypsum, and salt, in or in about the proportions hereinbefore set forth.

In testimony that I claim the foregoing as my own I affix my signature in presence of two witnesses.

GEORGE BRAGANZA OAKES.

Witnesses:
JOSEPH HENRY CHURCHILL,
WILLIAM HENRY TAYLOR.